(12) United States Patent
Godo

(10) Patent No.: US 8,204,661 B2
(45) Date of Patent: Jun. 19, 2012

(54) REDUCED POWER MODE FOR AN AIRCRAFT ELECTRIC BRAKE SYSTEM

(75) Inventor: Erik Godo, Redmond, WA (US)

(73) Assignee: The Boeing Company, Chicago, IL (US)

( * ) Notice: Subject to any disclaimer, the term of this patent is extended or adjusted under 35 U.S.C. 154(b) by 1165 days.

(21) Appl. No.: 11/614,953

(22) Filed: Dec. 21, 2006

(65) Prior Publication Data

US 2008/0154443 A1 Jun. 26, 2008

(51) Int. Cl.
*G06F 7/70* (2006.01)
*G06G 7/00* (2006.01)
*G06G 7/76* (2006.01)

(52) U.S. Cl. .......... 701/70; 701/3; 701/75; 701/78

(58) Field of Classification Search .......... 701/3, 70, 701/75, 78; 188/72.1, 156; 244/110 A; 303/3, 303/20, 152
See application file for complete search history.

(56) References Cited

U.S. PATENT DOCUMENTS

| | | | | |
|---|---|---|---|---|
| 5,417,477 | A * | 5/1995 | Lasbleis | 303/3 |
| 6,095,293 | A * | 8/2000 | Brundrett et al. | 188/72.1 |
| 6,183,051 | B1 * | 2/2001 | Hill et al. | 303/126 |
| 6,702,069 | B2 * | 3/2004 | Ralea et al. | 188/71.5 |
| 6,820,946 | B2 * | 11/2004 | Salamat et al. | 303/122.09 |
| 6,913,326 | B1 * | 7/2005 | Ohkubo et al. | 303/11 |
| 7,128,376 | B2 * | 10/2006 | Williams et al. | 303/15 |
| 2001/0045771 | A1 * | 11/2001 | Corio et al. | 303/20 |
| 2003/0070885 | A1 * | 4/2003 | Tachiiri et al. | 188/2 D |
| 2005/0173980 | A1 * | 8/2005 | Bohm et al. | 303/155 |
| 2005/0189814 | A1 * | 9/2005 | Mallevais et al. | 303/3 |
| 2005/0192733 | A1 * | 9/2005 | Dellac et al. | 701/70 |
| 2006/0108864 | A1 * | 5/2006 | Evans et al. | 303/126 |
| 2007/0175713 | A1 * | 8/2007 | DeVlieg et al. | 188/158 |
| 2007/0284939 | A1 * | 12/2007 | Charles et al. | 303/152 |
| 2008/0030069 | A1 * | 2/2008 | Griffith et al. | 303/20 |
| 2008/0149436 | A1 * | 6/2008 | Griffith et al. | 188/110 |

FOREIGN PATENT DOCUMENTS

WO 2007/088461 12/2007

* cited by examiner

*Primary Examiner* — Khoi Tran
*Assistant Examiner* — Jorge Peche
(74) *Attorney, Agent, or Firm* — Parsons Behle & Latimer

(57) ABSTRACT

An electric brake system for an aircraft as described herein is capable of operating in a normal full power mode, a low power mode, and a sleep mode. The full power mode is supported by the active power supply of the aircraft, while the low power and sleep modes are supported by the backup power supply (e.g., a battery) of the aircraft. The low power mode is activated in response to the detection of certain conditions or operating states where full braking performance is not required. For example, the low power mode can be utilized in connection with towing operations and parking brake adjustment operations. The sleep mode is activated in response to the absence of braking commands for an extended period of time. Various parameters and/or settings of the electric brake system are adjusted, controlled, or regulated during the low power and sleep modes to achieve reduced power consumption relative to the full power mode.

20 Claims, 2 Drawing Sheets

REDUCED POWER MODE FOR AN AIRCRAFT ELECTRIC BRAKE SYSTEM

TECHNICAL FIELD

Embodiments of the present invention relate generally to an electric brake system for an aircraft. More particularly, embodiments of the present invention relate to a brake control scheme that provides a reduced power consumption mode for the electric brake system.

BACKGROUND

Under normal operating conditions, an electric brake system for an aircraft relies upon an active power source, e.g., a power supply that is driven by the aircraft engine or engines. Such an active power supply can provide sufficient energy to drive the electric brake actuators on the aircraft, which may require relatively high drive power. There are, however, certain situations where aircraft rely upon backup power supplies. For example, an aircraft may utilize a battery (when the aircraft engines are not running) during towing, maintenance, or parking brake adjustment operations. The weight and size of the battery is dictated by the backup power consumption requirements of the aircraft and, therefore, aircraft designers often strive to reduce these requirements.

An aircraft need not always utilize its full braking performance capabilities. For example, full braking performance is usually not required during towing operations and parking brake adjustment operations because the aircraft is traveling at a very slow pace or is stationary. Even though full braking force is not required during these operations, an electric brake system may still consume a high amount of power by maintaining its full braking capacity.

BRIEF SUMMARY

The techniques and technologies described herein control the operation of an electric brake system of an aircraft to reduce discharge of a backup power source (e.g., a battery) when full braking performance is not needed. The electric brake system of the aircraft is controlled for operation in a low power mode to reduce drain on the battery during towing and parking brake cinching operations. Moreover, the electric brake system of the aircraft is controlled for operation in a sleep mode in the absence of braking commands.

The above and other aspects of the invention may be carried out in one embodiment by a method of operating an electric brake system of an aircraft in different power consumption modes. The method involves: operating the electric brake system in a full power mode corresponding to a first maximum brake performance capability; detecting a condition that triggers a reduced power mode for the electric brake system; switching from the full power mode to the reduced power mode; and while in the reduced power mode, operating the electric brake system in a low power mode corresponding to a second maximum brake performance capability that could be less than the first maximum brake performance capability.

The above and other aspects of the invention may be carried out in another embodiment by a method of operating an electric brake system of an aircraft in different power consumption modes. The method involves: determining when full brake performance is not required, wherein full brake performance corresponds to a first maximum brake performance capability; and if full brake performance is not required, operating the electric brake system in a low power mode corresponding to a second maximum brake performance capability that is less than the first maximum brake performance capability.

The above and other aspects of the invention may be carried out in another embodiment by an electric brake system for an aircraft. The electric brake system includes a brake mechanism and a brake control architecture coupled to the brake mechanism. The brake control architecture includes processing logic configured to: control operation of the electric brake system in a full power mode during which the brake mechanism has a first maximum brake performance capability; switch from the full power mode to a low power mode upon detection of a triggering condition; and control operation of the electric brake system in the low power mode during which the brake mechanism has a second maximum brake performance capability that is less than the first maximum brake performance capability.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of the invention.

Figure 1:
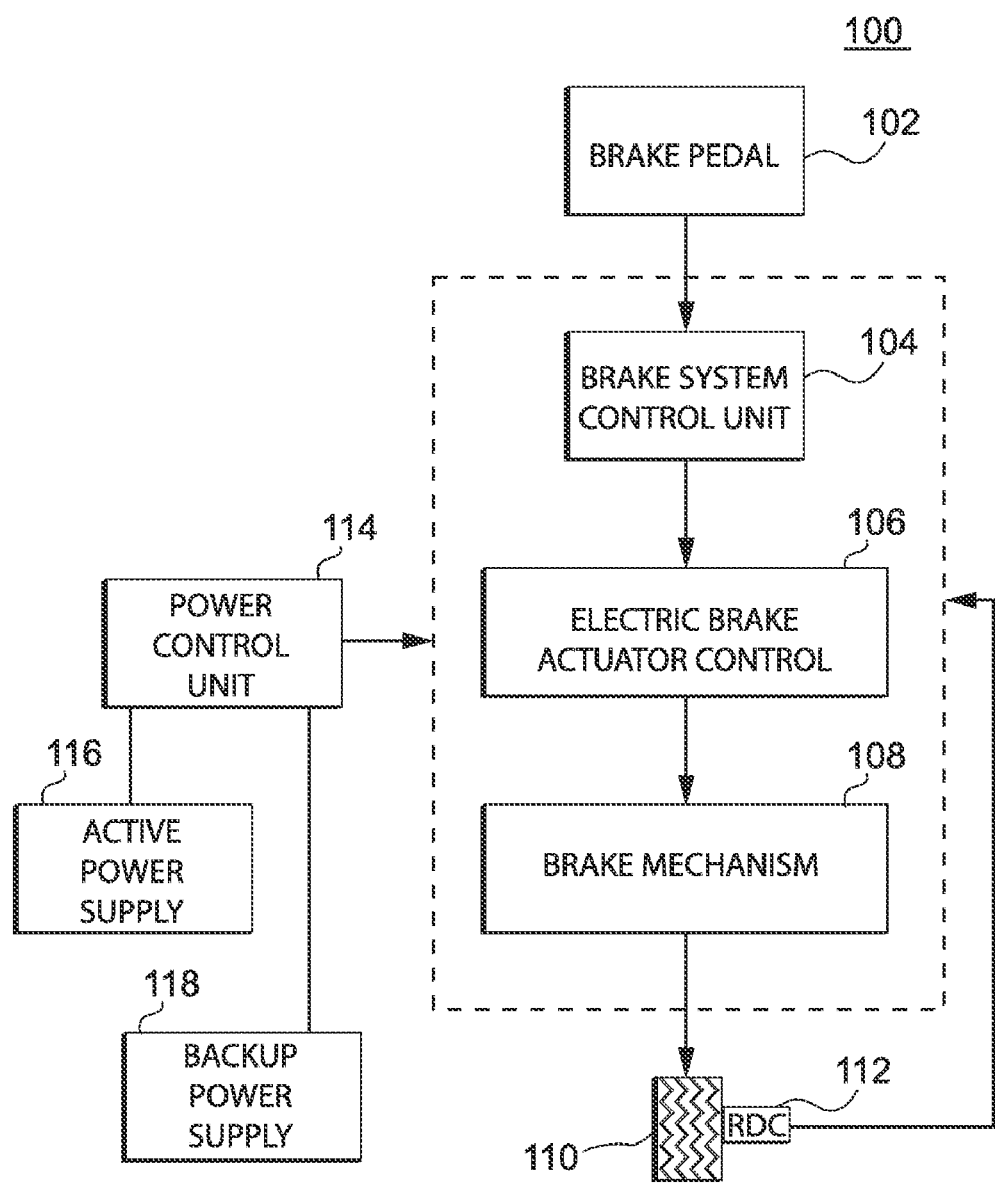
FIG. 1 is a simplified schematic representation of a portion of an electric brake system suitable for use in an aircraft.

FIG. 1 is a schematic representation of a portion of an electric brake system 100 suitable for use in an aircraft (not shown). Electric brake system 100 includes a brake pedal 102, a Brake System Control Unit (BSCU) 104 coupled to brake pedal 102, an Electric Brake Actuator Control (EBAC) 106 coupled to BSCU 104, and a brake mechanism 108 coupled to EBAC 106. Brake mechanism 108 corresponds to at least one wheel 110 of the aircraft. Electric brake system 100 may also include an axle-mounted remote data concentrator (RDC) 112 coupled to wheel 110. Briefly, BSCU 104 reacts to manipulation of brake pedal 102 and generates control signals that are received by EBAC 106. In turn, EBAC 106 generates brake mechanism control signals that are received by brake mechanism 108. In turn, brake mechanism 108 actuates to slow the rotation of wheel 110. These features and components are described in more detail below.

Electric brake system 100 can be applied to any number of electric braking configurations for an aircraft, and electric brake system 100 is depicted in a simplified manner for ease of description. An embodiment of electric brake system 100 may include a left subsystem architecture and a right subsystem architecture, where the terms "left" and "right" refer to the port and starboard of the aircraft, respectively. In practice, the two subsystem architectures may be independently controlled in the manner described below. In this regard, an embodiment of electric brake system 100 as deployed may include a left brake pedal, a right brake pedal, a left BSCU, a right BSCU, any number of left EBACs coupled to and controlled by the left BSCU, any number of right EBACs coupled to and controlled by the right BSCU, a brake mechanism for each wheel (or for each group of wheels), and an RDC for each wheel (or for each group of wheels). In operation, the electric brake system can independently generate and apply brake actuator control signals for each wheel of the aircraft or concurrently for any group of wheels.

Brake pedal 102 is configured to provide pilot input to electric brake system 100. The pilot physically manipulates brake pedal 102, resulting in deflection or movement (i.e., some form of physical input) of brake pedal 102. This physical deflection is measured from its natural position by a hardware servo or an equivalent component, converted into a BSCU pilot command control signal by a transducer or an equivalent component, and sent to BSCU 104. The BSCU pilot command control signal may convey brake pedal sensor data that may include or indicate the deflection position for brake pedal 102, the deflection rate for brake pedal 102, a desired braking condition for brake mechanism 108, or the like.

An embodiment of electric brake system 100 may use any number of BSCUs 104. For ease of description, this example includes only one BSCU 104. BSCU 104 is an electronic control unit that has embedded software that digitally computes EBAC control signals that represent braking commands. The electrical/software implementation allows further optimization and customization of braking performance and feel if needed for the given aircraft deployment.

BSCU 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 104 is implemented with a computer processor (such as a PowerPC 555) that hosts software and provides external interfaces for the software.

BSCU 104 monitors various aircraft inputs to provide control functions such as, without limitation: pedal braking; parking braking; automated braking; and gear retract braking. In addition, BSCU 104 blends antiskid commands (which could be generated internally or externally from BSCU 104) to provide enhanced control of braking. BSCU 104 obtains pilot command control signals from brake pedal 102, along with wheel data (e.g., wheel speed, rotational direction, tire pressure, etc.) from RDC 112. BSCU 104 processes its input signals and generates one or more EBAC control signals that are received by EBAC 106. In practice, BSCU 104 transmits the EBAC control signals to EBAC 106 via a digital data bus. In a generalized architecture (not shown), each BSCU can generate independent output signals for use with any number of EBACs under its control.

BSCU 104 may be coupled to one or more associated EBACs 106. EBAC 106 may be implemented, performed, or realized in the manner described above for BSCU 104. In one embodiment, EBAC 106 is realized with a computer processor (such as a PowerPC 555) that hosts software, provides external interfaces for the software, and includes suitable processing logic that is configured to carry out the various EBAC operations described herein. EBAC 106 obtains EBAC control signals from BSCU 104, processes the EBAC control signals, and generates the brake mechanism control signals (brake actuator signals, which are generally high power signals) for brake mechanism 108.

Notably, the functionality of BSCU 104 and EBAC 106 may be combined into a single processor-based feature or component. In this regard, BSCU 104, EBAC 106, or the combination thereof can be considered to be a brake control architecture for electric brake system 100. Such a brake control architecture includes suitably configured processing logic, functionality, and features that support the brake control operations described herein.

Wheel 110 may include an associated brake mechanism 108. EBAC 106 controls brake mechanism 108 to apply, release, modulate, and otherwise control the actuation of one or more components of brake mechanism 108. In this regard, EBAC 106 generates the brake mechanism control signals in response to the respective EBAC control signals generated by BSCU 104. The brake mechanism control signals are suitably formatted and arranged for compatibility with the particular brake mechanism 108 utilized by the aircraft. In practice, the brake mechanism control signals may be regulated to carry out anti-skid and other braking maneuvers. Those skilled in the art are familiar with aircraft brake mechanisms and the general manner in which they are controlled, and such known aspects will not be described in detail here.

Electric brake system 100 may include or communicate with one or more sensors for wheel 110. These sensors are suitably configured to measure wheel data (wheel speed, direction of wheel rotation, tire pressure, wheel/brake temperature, etc.) for wheel 110, where the wheel data can be utilized by electrical braking system 100. RDC 112 is generally configured to receive, measure, detect, or otherwise obtain data for processing and/or transmission to another component of electric brake system 100. Here, RDC 112 is coupled to (or is otherwise associated with) wheel 110, and RDC 112 is configured to collect and transmit its wheel data to BSCU 104. The digital data communication bus or buses on the aircraft may be configured to communicate the wheel data from RDC 112 to BSCU 104 using any suitable data communication protocol and any suitable data transmission scheme. In an alternate embodiment, RDC 112 may be configured to communicate the wheel data to EBAC 106. In yet another embodiment, RDC 112 may be configured to communicate the wheel data (or portions thereof) to both BSCU 104 and EBAC 106.

Electric brake system 100 may include or cooperate with a suitably configured power control unit or subsystem 114. Power control unit 114 may be coupled to BSCU 104, EBAC 106, brake mechanism 108, and/or to other components of electric brake system 100. Power control unit 114 may be configured to regulate, remove, or otherwise control power to one or more components of electric brake system 100 as needed to achieve a desired operating power mode. Power control unit 114 may also be configured to monitor the aircraft power systems and power buses that feed electric brake system 100. For example, power control unit 114 may be coupled to an active power supply 116 for the aircraft and to a backup power supply 118 (e.g., a battery) for the aircraft. Active power supply 116 may include a generator coupled to an engine and a suitably configured AC-to-DC converter, such as a Transformer Rectifier Unit (TRU). In this embodiment, active power supply 116 provides power generated from the aircraft engine(s), while backup power supply 118 provides power to the aircraft when the engine(s) are not running. Power control unit 114 may be suitably configured to provide operating power to electric brake system 100 from active power supply 116 and/or backup power supply 118, and power control unit 114 may be configured to provide a full power mode, a reduced power mode, a low power mode, or a sleep mode in the manner described in more detail herein.

Electric brake system 100 can be suitably configured to support different power consumption modes. For example, electric brake system 100 preferably supports a low power mode and a sleep mode to reduce power consumption when full brake performance (e.g., clamping force) is not needed. Once brake pedal 102 is deflected, however, electric brake system 100 can recover into a full power mode (or, switch from the sleep mode to the low power mode) with a corresponding increase in brake performance capability. Under certain conditions, the electric brake system 100 can enter the sleep mode. Such operation reduces drain on backup power supply 118 and reduces the amount of power that must be dissipated for the loss of cooling that is present during many aircraft operational states.

Electric brake system 100 may be designed to enter the reduced power mode upon detection of certain conditions. For example, electric brake system 100 may be configured to switch from the full power mode to the reduced power mode upon detection of any of the following triggering conditions: (1) receiving a "standby power supply" message from power control unit 114; (2) determining that power control unit 114 is invalid for at least a threshold period of time; or (3) determining that EBAC 106 has lost data communication from the rest of the aircraft for at least a threshold period of time. For simplicity and clarity, various communication paths from BSCU 104 and EBAC 106 to other components of the aircraft are not depicted in FIG. 1.

In one embodiment, a low power mode will be active during towing operations and during parking brake cinching operations. In both of these cases high braking performance is not required, or a short delay into full braking performance is tolerable. Towing operations can rely on the aircraft battery for up to one hour or longer, while parking brake adjustment operations can last up to one hour due to cooling of brake mechanism 108. In practice, the aircraft may be powered down during these operations, so the battery would be providing power during the time the brakes are cooling and the parking brake is adjusted.

Variations in system communication may also be utilized to reduce power consumption of backup power supply 118. For example, if a brake system control signal message is normally sent every five milliseconds and responded to every five milliseconds, then during the low power mode the time between messages could be much longer (up to one second in some embodiments) to minimize power consumed in determining a response. Moreover, some functions of electric brake system 100 may be disabled to further reduce power consumption during these operations. For example, antiskid is not needed during towing or during parking brake adjustments.

Figure 2:
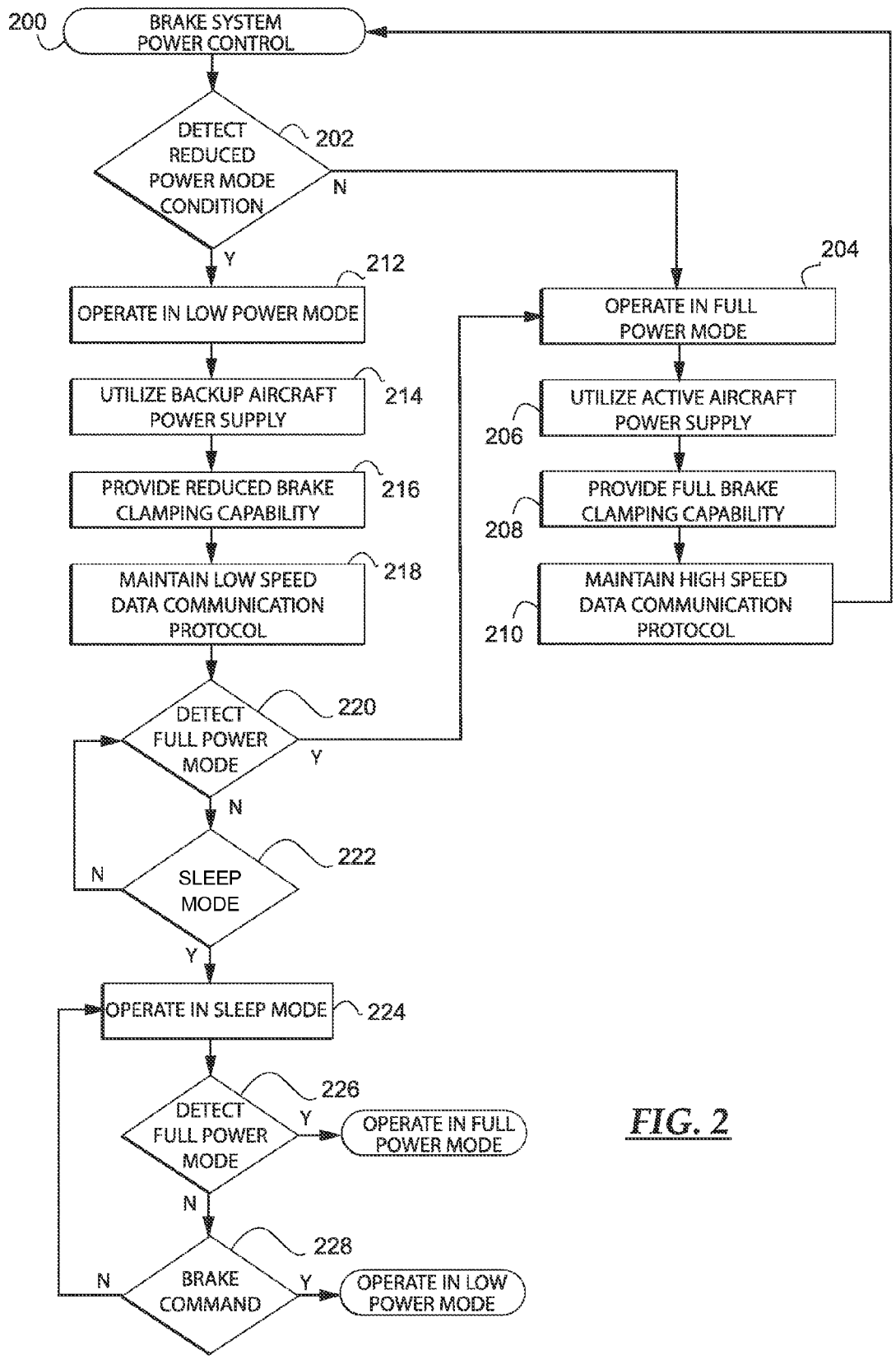
FIG. 2 is a flow chart that illustrates a power control process suitable for use in an electric brake system of an aircraft.

FIG. 2 is a flow chart that illustrates a power control process 200 suitable for use in an electric brake system of an aircraft. The various tasks performed in connection with process 200 may be performed by software, hardware, firmware, or any combination thereof. For illustrative purposes, the following description of process 200 may refer to elements mentioned above in connection with FIG. 1. In embodiments of the invention, portions of process 200 may be performed by different elements of the described system, e.g., a BSCU, an EBAC, a power control unit, or the like. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein.

For this example, power control process 200 assumes that the aircraft is initially operating in its full power mode where the electric brake system has a first maximum brake performance capability (e.g., 100% clamping force). In other words, the maximum brake performance in the full power mode represents 100% of the brake performance of the electric brake system. If process 200 detects a condition that triggers the reduced power mode for the electric brake system (query task 202), then the electric brake system will switch from the full power mode to the reduced power mode. Otherwise, the electric brake system will continue operating in the full power mode (task 204).

Power control process 200 may use one or more tests to detect the reduced power mode condition. One triggering condition is associated with the receipt of a "standby power supply" message, which indicates that the aircraft is currently being powered by a standby or backup power supply in lieu of the normal active power supply. Referring to FIG. 1, for example, if power control unit 114 generates a "standby power supply" message for BSCU 104 and/or for EBAC 106, then the electric brake system can switch from the normal full power mode to the reduced power mode. In an embodiment where the aircraft includes two power control units (one for a left side electric brake subsystem architecture and one for a right side electric brake subsystem architecture), query task 202 may detect the reduced power mode condition when both power control units generate a respective "standby power supply" message for the electric brake system.

Another triggering condition is associated with an invalid state for one or more power control units of the aircraft. As used herein, a power control unit is deemed "invalid" when the electric brake system receives no information or data from the power control unit. If, for example, the electric brake system determines that a power control unit is invalid for at least a threshold period of time, then query task 202 may detect the reduced power mode condition. In an embodiment where the aircraft includes two power control units, query task 202 may detect the reduced power condition if one power control unit is invalid and the other power control unit provides a "standby power supply" message as described above. Alternatively, query task 202 may detect the reduced power condition if both power control units are deemed invalid for at least a threshold period of time, e.g., two minutes or any appropriate length of time.

Yet another triggering condition is associated with a lack of information received by an EBAC. As described above, EBACs are electrically controlled to generate actuator control signals for the electric brake actuators. If for any reason an EBAC has lost input data communication (i.e., it is no longer receiving control or command signals) for at least a threshold period of time, then query task 202 may detect the reduced power condition. This threshold period of time may be, for example, two minutes or any appropriate length of time.

While in the full power mode, the electric brake system relies upon and utilizes an active power supply of the aircraft, which generates operating power when the aircraft engines are running (task 206). While in the full power mode, the electric brake system provides full brake performance capability that represents 100% of the system braking potential (task 208). For this embodiment, the EBACs in the electric brake system are controlled with 130 volt power signals from the power control unit 114; these 130 volt power signals are used to actuate the motors of the respective brake mechanisms. In practice, operating an EBAC in the full power mode may draw about two kilowatts from the active power supply. In practice, brake performance changes between modes include, without limitation: clamping force reduction; and brake frequency response reduction leading to antiskid performance reduction. Power relates to speed of operation (motor acceleration) and how much the brake can clamp (motor torque), which should be apparent to someone skilled in the art of electric motors.

While in the full power mode, the electric brake system may also maintain a relatively high speed data communication protocol for the transmission of control signal messages (task 210). Such high speed data communication may be desirable to support a relatively high frame or message rate during normal braking operations, such as 200 Hz. In one embodiment, messages for the electric brake system are exchanged once every five milliseconds while operating in the full power mode to ensure quick brake system response and rapid data updating.

If query task 202 detects a reduced power mode condition, then process 200 causes the electric brake system to operate in the low power mode (task 212). Query task 202 enables the electric brake system to determine when full brake performance is not required and, consequently, when to activate the low power mode. For example, power control process 200 may activate the low power mode during towing operations for the aircraft and/or during parking brake cinching operations for the aircraft. In practice, when the power source switches to the backup source, the low power mode can be initiated.

While in the low power mode, the electric brake system relies upon and utilizes a backup power supply of the aircraft, which generates operating power when the aircraft engines are not running (task 214). While in the low power mode, the electric brake system provides reduced brake performance capability that represents less than 100% of the system braking potential (task 216). In other words, the maximum brake performance capability in the low power mode is less than the maximum brake performance capability in the full power mode. In typical applications, the reduced capability is about 60% of the system braking clamping force potential. To realize this reduced braking capability, the EBACs can be controlled in a manner that limits their average and/or peak power consumption. Alternatively (or additionally), the EBACs can be controlled in a manner that increases their response time. Alternatively (or additionally), the electric brake system may employ a torque limiter, a load cell, a brake actuator position sensor, and/or other components at the brake mechanisms that can provide feedback data that indicates a brake actuation level. In response to such data, the electric brake system can regulate the application of the brake mechanisms via the EBACs. In practice, operating an EBAC in the low power mode may draw only several hundred watts from the active power supply (in contrast to two kilowatts in the full power mode).

While in the low power mode, the electric brake system may also maintain a relatively low speed data communication protocol for the transmission of control signal messages (task 218). Such low speed data communication may be desirable to support a relatively low frame or message rate during aircraft operations that are somewhat immune to the data rate. For example, in the low power mode, the delay between messages can be much longer (e.g., up to 10-100 milliseconds) relative to the delay in the full power mode. This results in less message transmissions and, in turn, less power consumed to process all the messages and actuate the brakes. In practice, the changing of the data communication protocol may be handled by the BSCU (or BSCUs).

If power control process 200 detects a full power mode condition (query task 220) while the electric brake system is in the reduced power mode, then the electric brake system switches back to the full power mode. While operating in the reduced power mode, the electric brake system may monitor other conditions to determine whether or not to enter the sleep mode. Thus, power control process 200 may be designed to detect any appropriate sleep mode condition. As one example of this feature, process 200 may monitor an elapsed time since the occurrence of a specified condition, such as the idle time between brake commands. The idle time represents the elapsed time since receiving/processing the last braking command. In FIG. 2, if the sleep mode is triggered (query task 222), then process 200 may continue to maintain the low power mode, continue monitoring for a sleep mode condition, and continue monitoring for a condition that triggers the full power mode.

If the particular sleep mode conditions have been satisfied, then power control process 200 can switch from the low power mode to a sleep mode and prompt the electric brake system to operate in the sleep mode (task 224). While in the sleep mode, the electric brake system still relies upon and utilizes the backup power supply of the aircraft. However, the sleep mode relies upon quiescent power consumption from the backup power supply, where such quiescent power consumption is less than the reduced power consumption that occurs in the low power mode. In practice, this quiescent power consumption represents a minimum power requirement that enables the electric brake system to receive, generate, and respond to data messages (the electric brake system need not do anything else during this mode). Since braking is not commanded in the sleep mode, the electric brake system need not be maintained in a mode that requires immediate reaction to brake actuation signals. Indeed, while in the sleep mode, the electric brake system need not provide any brake clamping force at all. To realize the sleep mode, the EBACs can be powered down or held in a standby power state. In practice, operating an EBAC in the sleep mode may draw no power from the active power supply (in contrast to two kilowatts in the full power mode).

While in the sleep mode, the electric brake system may also maintain a relatively low speed data communication protocol for the transmission of control signal messages as described above in connection with task 218. To further conserve energy, a very low speed data communication protocol may be used during the sleep mode, including no communication from the BSCU to the EBAC.

If power control process 200 detects a full power mode condition (query task 226) while the electric brake system is in the sleep mode, then the electric brake system switches back to the full power mode. In practice, the electric brake system is configured to transition back to the full power mode within a relatively short time period—typically less than one second. If the electric brake system receives a braking command while operating in the sleep mode (query task 228), then process 200 may cause the electric brake system to switch back to the low power mode in response to the braking command if the backup power source is active (as depicted in FIG. 2). Alternatively, process 200 may cause the electric brake system to switch back to the full power mode in response to the braking command. Otherwise, the electric brake system can continue to operate in the sleep mode to conserve energy.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method of operating an electric brake system in different power consumption modes, the method comprising:
    operating the electric brake system in a full power mode corresponding to a first maximum brake performance capability, said full power mode powering all operational actuators, said full power mode comprising all of said operational actuators independently actuated with respect to at least one wheel to achieve 100 percent braking clamping force potential;
    detecting a condition that triggers a reduced power mode for the electric brake system;
    in response to said detecting switching from the full power mode to the reduced power mode, said reduced power mode powered only by a back-up power supply, said reduced power mode comprising powering said operational brake actuators with lower power consumption compared to said full power mode; and
    while in the reduced power mode, operating the electric brake system in a low power mode comprising a second maximum brake performance capability that is less than the first maximum brake performance capability.

2. A method according to claim 1, further comprising:
    maintaining a relatively high speed data communication protocol for control signal messages of the electric brake system when operating the electric brake system in the full power mode; and
    maintaining a relatively low speed data communication protocol for control signal messages of the electric brake system when operating the electric brake system in the low power mode.

3. A method according to claim 1, wherein operating the electric brake system in the full power mode relies upon an active power supply.

4. A method according to claim 1, wherein operating the electric brake system in the low power mode relies upon said backup power supply.

5. A method according to claim 1, further comprising:
    detecting a sleep mode condition that triggers a sleep mode for the electric brake system;
    switching to the sleep mode in response to detection of the sleep mode condition; and
    operating the electric brake system in the sleep mode.

6. A method according to claim 5, wherein operating the electric brake system in the sleep mode relies upon quiescent power consumption from said backup power supply.

7. A method according to claim 1, wherein detecting the condition that triggers the reduced power mode comprises receiving a standby power supply message from a power control unit.

8. A method according to claim 1, wherein detecting the condition that triggers the reduced power mode comprises determining that a power control unit is invalid for at least a threshold period of time.

9. A method according to claim 1, wherein detecting the condition that triggers the reduced power mode comprises determining that an electric brake actuator control has lost data communication for at least a threshold period of time.

10. A method of operating an electric brake system in different power consumption modes, the method comprising:
    detecting by said electric brake system when full brake performance is not required, wherein full brake performance corresponds to a first maximum brake performance capability, said first maximum brake performance capability comprising powering all operational actuators independently-actuated with respect to at least one wheel to achieve 100 percent braking clamping force potential; and
    if full brake performance is not required, operating the electric brake system in a low power mode comprising a second maximum brake performance capability that is less than the first maximum brake performance capability, said low power mode powered only by a back-up power supply, said reduced power mode comprising powering said operational brake actuators with lower power consumption compared to said full power mode.

11. A method according to claim 10, further comprising operating the electric brake system in a sleep mode in response to detection of a sleep mode condition, wherein power consumption in the sleep mode is less than power consumption in the low power mode.

12. A method according to claim 11, further comprising:
while operating in the sleep mode, receiving a braking command; and
in response to the braking command, switching to a full power mode corresponding to the first maximum brake performance capability.

13. A method according to claim 11, further comprising:
while operating in the sleep mode, receiving a braking command; and
in response to the braking command, switching to the low power mode.

14. A method according to claim 10, further comprising activating the low power mode during towing operations.

15. A method according to claim 10, further comprising activating the low power mode during parking brake cinching operations.

16. A method according to claim 10, further comprising changing a data communication protocol for the electric brake system to accommodate the low power mode.

17. A method according to claim 16, wherein changing the data communication protocol comprises reducing the frequency of transmission of control signal messages for the electric brake system.

18. An electric brake system, the electric brake system comprising:
a brake mechanism; and
a brake control architecture coupled to the brake mechanism, the brake control architecture comprising processing logic configured to:
control operation of the electric brake system in a full power mode during which the brake mechanism has a first maximum brake performance capability, said full power mode powering all operational actuators, said full power mode comprising all of said operational actuators independently actuated with respect to at least one wheel to achieve 100 percent braking clamping force potential;
switch from the full power mode to a low power mode upon detection of a triggering condition, said low power mode powered only by a back-up power supply, said reduced power mode comprising powering said operational brake actuators with lower power consumption compared to said full power mode; and
control operation of the electric brake system in the low power mode during which the brake mechanism includes a second maximum brake performance capability that is less than the first maximum brake performance capability.

19. An electric brake system according to claim 18, wherein the processing logic of the brake control architecture is configured to:
detect a sleep mode condition that triggers a sleep mode for the electric brake system; and
thereafter control operation of the electric brake system in the sleep mode, wherein power consumption of the electric brake system in the sleep mode is less than power consumption of the electric brake system in the low power mode.

20. An electric brake system according to claim 18, wherein the processing logic of the brake control architecture is configured to change a data communication protocol for the electric brake system to accommodate the low power mode.

* * * * *